(12) United States Patent
Yeum et al.

(10) Patent No.: US 11,561,110 B2
(45) Date of Patent: Jan. 24, 2023

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Jun Sun Yeum, Hwaseong-si (KR); Jin Woo Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 649 days.

(21) Appl. No.: 16/598,691

(22) Filed: Oct. 10, 2019

(65) Prior Publication Data

US 2021/0010818 A1 Jan. 14, 2021

(30) Foreign Application Priority Data

Jul. 8, 2019 (KR) .................. 10-2019-0081980

(51) Int. Cl.
*G01C 21/34* (2006.01)
*G06Q 30/02* (2012.01)
*G06N 5/04* (2006.01)

(52) U.S. Cl.
CPC .......... *G01C 21/3484* (2013.01); *G06N 5/04* (2013.01); *G06Q 30/0283* (2013.01)

(58) Field of Classification Search
CPC . G01C 1/00–25/00; G06N 3/00–20/00; G06Q 10/00–50/00
USPC ..................................... 701/1–500
See application file for complete search history.

(56) References Cited

U.S. PATENT DOCUMENTS

| | | | | |
|---|---|---|---|---|
| 8,600,835 B1* | 12/2013 | Lueck | ............... | G06Q 30/0283 705/26.1 |
| 2010/0082447 A1* | 4/2010 | Lin | ............... | G06Q 30/0601 705/26.1 |
| 2010/0082455 A1* | 4/2010 | Rosenblatt | ......... | G06Q 30/0601 705/26.1 |
| 2013/0253832 A1* | 9/2013 | Nallu | ............... | G01C 21/3697 701/538 |
| 2013/0297443 A1* | 11/2013 | Maass | ............... | G06Q 30/0611 705/26.4 |
| 2014/0358724 A1* | 12/2014 | Nallu | ............... | G06F 16/24575 705/26.8 |
| 2015/0012384 A1* | 1/2015 | Bank | ............... | G06Q 30/0633 705/26.41 |
| 2015/0058154 A1* | 2/2015 | Appleyard | ......... | G06Q 30/0633 705/26.4 |

(Continued)

*Primary Examiner* — Alan S Miller
(74) *Attorney, Agent, or Firm* — Slater Matsil, LLP

(57) ABSTRACT

A vehicle and a method of controlling the same are provided. The vehicle may include a storage configured to store map information and store information, an inputter configured to receive an input of a destination and an item list from a user, and a controller configured to generate a traveling route of the vehicle based on the stored map information and the received destination, and determine at least one store of the plurality of stores that is located within a predetermined distance with respect to the generated travelling route and sells at least one item included in the received list of items, wherein the controller modifies the generated travelling route such that the vehicle passes through at least one store of the plurality of stores based on a location of at least one store of the plurality of stores.

14 Claims, 12 Drawing Sheets

(56) References Cited

U.S. PATENT DOCUMENTS

| | | | | |
|---|---|---|---|---|
| 2015/0260537 A1* | 9/2015 | MacNeille | ............... | H04W 4/02 |
| | | | | 701/400 |
| 2016/0171592 A1* | 6/2016 | Pugh | ....................... | G06F 16/24 |
| | | | | 705/26.81 |
| 2017/0032290 A1* | 2/2017 | Ford | .................... | G06Q 10/087 |
| 2018/0293644 A1* | 10/2018 | Allen | ................. | G06Q 30/0633 |
| 2019/0188772 A1* | 6/2019 | Chaganti | ............. | G06F 16/9535 |
| 2019/0347704 A1* | 11/2019 | Stamboni | ........... | G06Q 30/0639 |

* cited by examiner

FIG. 7

| DESTINATION | CAMPING GROUND | HUSBAND'S PARENTS' HOME WIFE'S PARENTS' HOME | OFFICE | ... |
|---|---|---|---|---|
| LIST OF RECOMMENDED ITEMS | BOTTLED WATER<br>PORK<br>CHARCOAL<br>COOKIES<br>BEER<br>⋮ | FRUIT<br>CAKE<br>⋮ | COFFEE<br>⋮ | ... |

FIG. 8

| PURCHASE HISTORY | CAMPING GROUND (2019.05.10) | CONDOMINIUM (2019.04.30) | OFFICE (2019.04.28) | ... |
|---|---|---|---|---|
| LIST OF RECOMMENDED ITEMS | BOTTLED WATER<br>PORK<br>CHARCOAL<br>COOKIES<br>BEER<br>⋮ | BOTTLED WATER<br>PORK<br>BEEF<br>COOKIES<br>BEER<br>⋮ | COFFEE<br>⋮ | ... |

FIG. 9

| STORE | FIRST STORE | | | | SECOND STORE | | | | ... |
|---|---|---|---|---|---|---|---|---|---|
| | ITEM | BRAND | PRICE | PURCHASE QUANTITY | ITEM | BRAND | PRICE | PURCHASE QUANTITY | ... |
| ITEM LIST | BOTTLED WATER 2L | ILDA SOO | 700WON | - | PORK | JEJU DOLDON | 2600WON /100G | 2kg | ... |
| | COOKIES | SOONG PACOOL | 300WON | 1 | BEEF | BACKDOO DAEDON | 2200WON /100G | - | ... |
| | ... | SAEWOO DANG | 900WON | - | ... | ... | ... | ... | ... |
| | | | ... | ... | | | | | ... |
| TOTAL PRICE | | | 50000 WON | | | | 40000 WON | | PAYMENT |

VEHICLE AND METHOD OF CONTROLLING THE SAME

CROSS-REFERENCE TO RELATED APPLICATION

The present application claims priority to and the benefit of Korean Patent Application No. 10-2019-0081980, filed on Jul. 8, 2019, which is incorporated herein by reference in its entirety.

TECHNICAL FIELD

The present disclosure relates to a vehicle capable of travelling on an optimal route by inputting a destination and a list of items to be purchased, and a method of controlling the same.

BACKGROUND

The statements in this section merely provide background information related to the present disclosure and may not constitute prior art.

A vehicle refers to a transportation device designed to move humans, objects, or animals from one position to another position while travelling on a road or railway. Examples of the vehicle include a three-wheeled or four-wheeled vehicle, a two-wheeled vehicle, such as a motorcycle, a construction machine, a motor bicycle, a bicycle, and a train traveling on a railway arranged on a track.

In the vehicle industry, the travelling route guide technology operates by receiving a navigation message transmitted from a satellite for GPS (Global Positioning System) to determine the current position of a moving object, matching the current position of the moving object with map information, displaying the matched current position on the screen, and searching for a travelling route from the current position to a destination.

In addition, such a travelling route guide technology provides a guidance allowing an occupant to drive a moving object along the found travelling route, so that a given road network may be efficiently used.

SUMMARY

The present disclosure provides a vehicle capable of generating a travelling route of the vehicle on the basis of a destination and a list of desired items that are input by a user, and allowing payment for purchasing items to be performed in the vehicle, and a method of controlling the same.

In one aspect of the present disclosure, there is provided a vehicle including: a storage configured to store map information and store information; an inputter configured to receive an input of a destination and a list of items from a user; and a controller configured to generate a traveling route of the vehicle on the basis of the stored map information and the received destination, and determine at least one store that is located within a predetermined distance with respect to the generated travelling route and sells at least one item included in the received list of items, wherein the controller modifies the generated travelling route such that the vehicle passes through the determined at least one store on the basis of a location of the determined at least one store.

The controller may be configured to: determine at least one store each selling all of the items included in the received item list; and determine a total price of all the items sold by each of the determined at least one store, and determine a store in which the total price of all the items is minimum.

The controller, when the items included in the received item list includes a predetermined item, may determine a store located closest to the received destination among stores selling the predetermined item.

The vehicle may further include a display configured to display information about the determined at least one store and the modified travelling route.

The at least one store may include a first store and a second store, wherein the controller may be configured to: determine an expected arrival time required to arrive at the destination by passing through the at least one store; and control the display to display the first store first when a first expected arrival time required to arrive at the destination by passing through the first store is shorter than a second expected arrival time required to arrive at the destination by passing through the second store.

The at least one store may include a first store and a second store, wherein the controller may be configured to: control the display to display the first store first when the first store sells a large number of types of items than the second store with respect to the items included in the received item list.

The storage may store a list of recommended items according to a destination, wherein the controller may control the display to display the stored list of recommended items on the basis of the received destination.

The storage may store a list of recommended items according to an item purchase history of the user, wherein the controller may control the display to display the stored list of recommended items.

The inputter may receive a selection of one or more store among the determined at least one store from the user, and the controller may control the display to display the first store first when the first store sells a larger number of types of items than with the second store with respect to the types of items included in the input item list.

The inputter may receive payment information for paying for at least one item included in the item list in the determined at least one store.

The vehicle may further include a communicator configured transmit the input payment information to a server.

The vehicle may determine an expected arrival time required for the vehicle to arrive at the determined at least one store on the basis of the modified travelling route.

The communicator may transmit the determined expected arrival time of the server.

In another aspect of the present disclosure, there is provided a method of controlling a vehicle, the method including: receiving an input of a destination from a user; generating a traveling route of the vehicle on the basis of the received destination; receiving a list of items from the user; determining at least one store that is located within a predetermined distance with respect to the generated travelling route and sells at least one item included in the received list of items; and modifying the generated travelling route such that the vehicle passes through the determined at least one store on the basis of a location of the determined at least one store.

The determining of the at least one store may include: determining at least one store each selling all of the items included in the received item list; and determining a total price of all the items sold by each of the determined at least one store, and determining a store in which the total price of all the items is minimum.

The determining of the at least one store may include: when the items included in the received item list includes a predetermined item, determining a store located closest to the received destination among stores selling the predetermined item.

The method may further include displaying information about the determined at least one store and the modified travelling route.

The method may further include determining an expected arrival time required for the vehicle to arrive at the destination by passing through the at least one store, wherein the at least one store may include a first store and a second store, and the displaying of the information about the determined at least one store may include displaying the first store first when a first expected arrival time required to arrive at the destination by passing through the first store is shorter than a second expected arrival time required to arrive at the destination by passing through the second store.

The at least one store may include a first store and a second store, and the displaying of the information about the determined at least one store may include displaying the first store first when the first store sells a large number of types of items than the second store with respect to the items included in the received item list.

The method may further include displaying a list of recommended items according to a destination.

The method may further include displaying a list of recommended items according to an item purchase history of the user.

The method may further include: receiving a selection of one or more store among the determined at least one store from the user; and modifying the generated travelling route such that the vehicle passes through the selected one or more store on the basis of locations of the selected one or more stores.

The method may further include: receiving payment information for paying for at least one item included in the item list in the determined at least one store.

The method may further include transmitting the input payment information to a server.

The method may further include determining an expected arrival time required for the vehicle to arrive at the determined at least one store on the basis of the modified travelling route.

The method may further include transmitting the determined expected arrival time of the server.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 is a diagram for describing a list of recommended items according to a destination.

FIG. 8 is a diagram for describing a list of recommended items according to a purchase history.

FIG. 9 is a diagram illustrating a payment window for paying for a purchased item in a vehicle in one form of the present disclosure.

Figure 1:
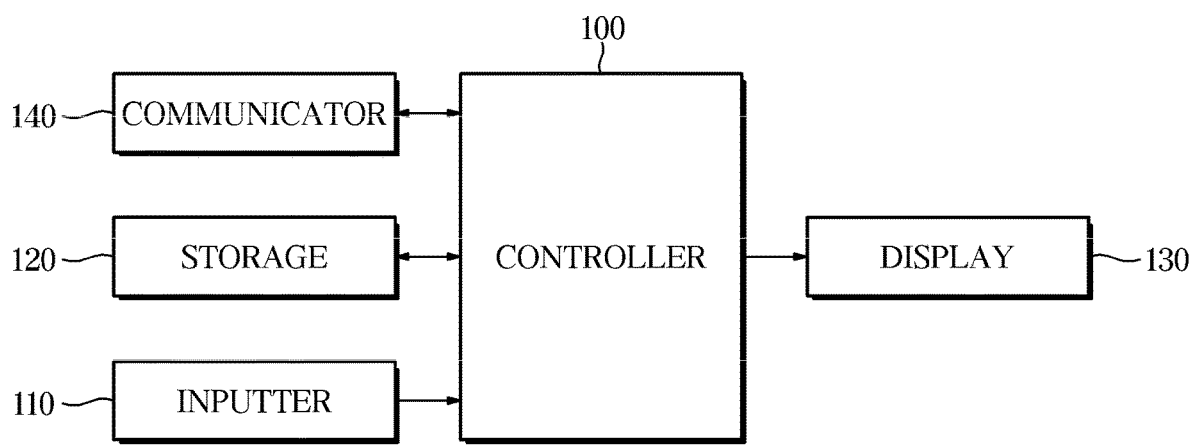
FIG. 1 is a block diagram illustrating a configuration of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout this specification, when a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that can be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Hereinafter, a touch input device, a vehicle including the same, and a method of controlling the same will be described in detail with reference to the accompanying drawings. In addition, parts irrelevant to description are omitted in the drawings in order to clearly explain some forms of the present disclosure.

In the disclosed specification, the term "store" refers to not only a place equipped with certain facility and selling items, but also a place equipped with certain facility and providing a service business. In other words, the term 'item' in the disclosed specification includes not only tangible but also intangible concepts, such as services.

FIG. 1 is a block diagram illustrating a configuration of a vehicle in some forms of the present disclosure.

Referring to FIG. 1, the vehicle in some forms of the present disclosure may include a controller 100 configured to generate a travelling route of the vehicle and perform control for notifying a user of information related to the generation of the travelling route, an inputter 110 configured to receive a command and selection from the user, a storage 120 configured to store various pieces of data, a display 130 configured to display various pieces of data under operation of the controller 110, and a communicator 140 configured to exchange data with an external server. In addition, although not shown in the drawings, the vehicle in some forms of the present disclosure may include a global positioning system (GPS) antenna configured to receive the position of the vehicle.

In detail, the storage 120 may store map information and store information. The map information may include information about roads, information about the locations of buildings, and other map related information, and the store information may include information about a list of items sold by a store, information about prices of items sold by a store, and other store related information.

To this end, the storage 120 may be implemented using at least one type of storage medium, such as a memory type (flash memory type), a hard disk type, a multimedia card micro type, a card type memory (for example, security digital (SD) or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The inputter 110 in some forms of the present disclosure may receive various control commands related to the control of the vehicle. For example, the inputter 110 of the vehicle may receive a destination and a list of items from the user. In addition, the inputter 110 may receive a selection of one or more stores among at least one store determined by the controller 100.

The inputter 110 may be a concept including all components provided to receive a control command from an occupant, such as a dial manipulation unit installed in a gearbox and a touch panel of the display 130 installed in a center fascia. For example, the inputter 110 may include a microphone as a configuration for the user to input a command by a speech.

When the inputter 110 is a touch panel of the display 130, the display 130 may display various pieces of information related to an input command of the vehicle and control of the vehicle including the input command. In addition, the display 130 may display various pieces of information generated by the controller 100, as will be described below. That is, the inputter 110 may be implemented as a touch panel, a touch screen, a touch pad, or the like, and the user may input a command or selection into the inputter 110 implemented as a touch panel, a touch screen, a touch pad, or the like through a finger or a touch pen.

The display 130 in some forms of the present disclosure may provide a user interface (UI) for providing a user with information related to a vehicle in the form of an image or text. For example, the display 130 may display a travelling route of the vehicle determined by the controller 100 and may display information about at least one store determined by the controller 100.

To this end, the display 130 may be embedded in the center fascia. However, the installation example of the display 130 is not limited thereto, and the display 130 may be provided to be separated from the center fascia of the vehicle.

In this case, the display 130 may be implemented as a liquid crystal display (LCD), a light emitting diode (LED), a plasma display panel (PDP), an organic light emitting diode (OLED), a cathode ray tube (CRT), or the like, but the implementation of the display 130 is not limited thereto.

In addition, the display 130 may include a touch panel to detect a touch input. Through this, the display 130 may receive a control command through a touch input from the outside and perform an operation according to the control command. That is, although the display 130 and the inputter 110 are separately illustrated in FIG. 1, the display 130 may include the inputter 110.

The communicator 140 in some forms of the present disclosure may transmit data received from the controller 100 to an external server, and transmit data received from the external server to the controller 100. In this case, the controller 100 may transmit the user's command, selection, and various pieces of information input through the inputter 110 to the communicator 140, and the communicator 140 may transmit the user's command, selection, and various pieces of information to the external server. For example, the communicator 140 may transmit an expected arrival time required to arrive at a destination to the external server, and may transmit payment information input from a user to the external server. In addition, the communicator 140 may receive current traffic information from the external server.

To this end, the communicator 140 in some forms of the present disclosure may include a controller area network (CAN) communication module, a wireless fidelity (WiFi) communication module, a universal serial bus (USB) communication module, and a Bluetooth communication module. In addition, the communicator 140 may further include a broadcasting communication module, such as transport protocol experts group (TPEG) of digital multimedia broadcasting (DMB), siriusXM(SXM), and radio data system (RDS).

The controller 100 in some forms of the present disclosure may generate various control signals for controlling the components in the vehicle. For example, the controller 100 may generate a travelling route of the vehicle on the basis of the map information stored in the storage 120 and the destination input into the inputter 110.

In addition, the controller 100 may determine at least one store located within a predetermined distance with respect to the generated travelling route and selling at least one item included in the input list of items, on the basis of the map information and the store information stored in the storage 120.

In addition, the controller 100 may modify the generated travelling route such that the vehicle passes through one or more stores selected by the user through the inputter 110, on the basis of the locations of the selected one or more stores.

To this end, the controller 100 includes a memory configured to store data regarding an algorithm for controlling the operations of components in the vehicle and a program representing the algorithm, and a processor for performing the above-described operation using the data stored in the memory. In this case, the memory and the processor may be implemented as separate chips. Alternatively, the memory and the processor may be implemented as a single chip. In addition, the controller 100 may transmit a signal to an electronic control unit (ECU) or a terminal. In this case, a signal may be transmitted using a CAN communication scheme.

The inputter 110, the storage 120, the communicator 140, and the display 130 in some forms of the present disclosure may transmit a respective piece of information thereof to the controller 100 through CAN communication. That is, a communication network including a body network, a multimedia network, a chassis network, and the like is provided in the vehicle for control of various electric loads mounted on the vehicle and communication between various electric loads. The separate networks may be connected to each other by the controller 100 to transmit and receive a CAN communication message therebetween.

Figure 2:
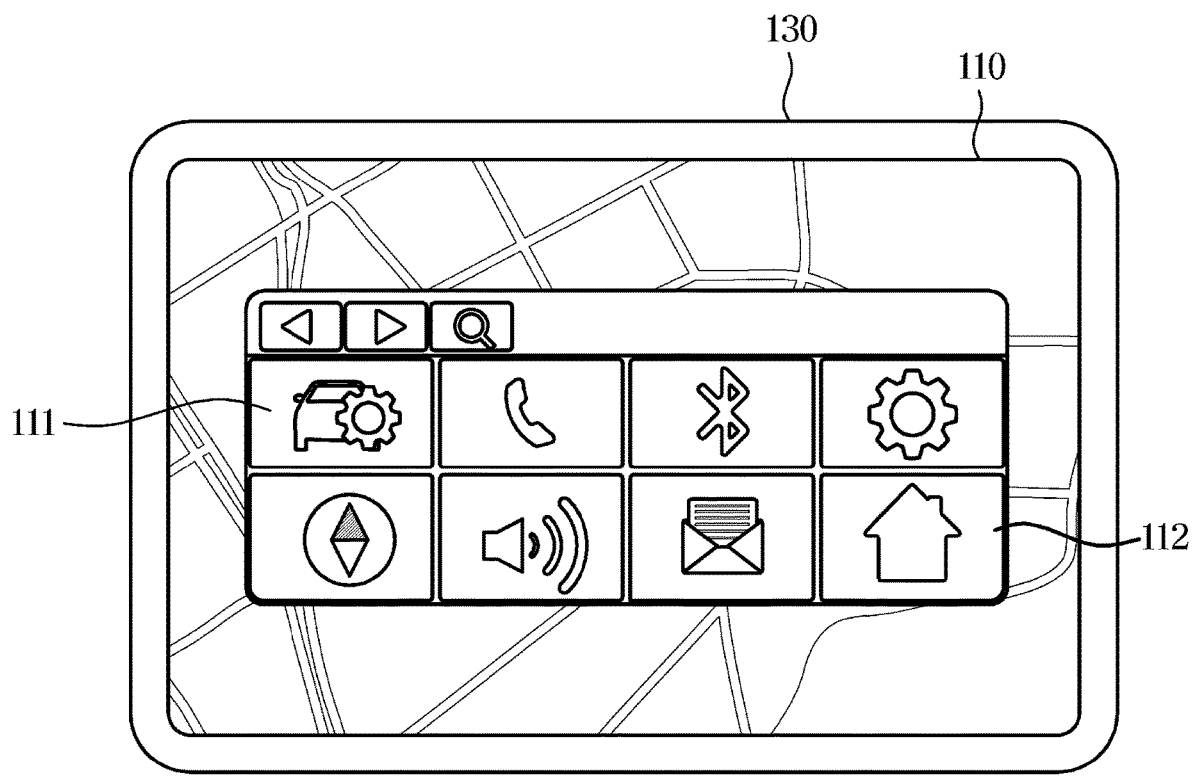
FIG. 2 is a diagram illustrating a configuration for receiving a destination and a list of items in one form of the present disclosure.

Hereinafter, the inputter 110 for receiving a destination and a list of items from a user will be described with reference to FIG. 2. FIG. 2 is a diagram illustrating a configuration for receiving a destination and a list of items in some forms of the present disclosure. Referring to FIG. 2, the display 130 in some forms of the present disclosure may include a touch panel to detect a touch input, and in this case, the touch panel may represent the inputter 110.

The display 130 in some forms of the present disclosure may include a first icon 111 for receiving a destination from the user and a second icon 112 for receiving an item list from the user. The user may select the first icon 111 using a finger or a touch pen to input a destination, and when a touch is input into the first icon 111, the controller 100 may control the display 130 to display a destination setting window for setting a destination.

In this case, the user may input the destination by directly inputting a text to the inputter 110 through a finger or a touch pen, or uttering a text through a speech.

When the inputter 110 receives the destination, the controller 100 may generate a travelling route of the vehicle on the basis of the map information stored in the storage 120 and the input destination. In this case, the controller 100 may generate an optimal travelling route by reflecting traffic information obtained through the communicator 140.

Thereafter, the user may select the second icon 112 to input a list of items to be purchased, and when a touch is input into the second icon 112, the controller 100 may control the display 130 to display an item input window for inputting a list of items.

The user may input the list of items to be purchased by directly inputting a text through a finger or a touch pen into the inputter 110, or by uttering a text through a speech. The list of items may include at least one item. In this case, the item may represent a type of an article, such as coffee, pork, beer, and the like. That is, when the user inputs each item of coffee and pork, it is considered that a list of items including two types of items has been input.

When the list of items is input through the inputter 110, the controller 100 may determine a store located within a predetermined distance with respect to the generated travelling route and selling at least one item included in the input list of item, on the basis of the store information and the map information stored in the storage 120.

For example, when items of pork and coffee are input from a user, a plurality of stores including a first store that sells both of pork and coffee and a second store that sells only pork may be determined.

In addition, the controller 100 may determine at least one store each selling all items included in the input list of items, determine a total price of all the items sold by each of the at least one store, and determine a store in which the total price is minimum.

For example, when items of pork and coffee are input from the user, a first store and a second store each selling both pork and coffee may be determined, and the total price for purchasing pork and coffee in the first store may be determined to 20000 won and the total price for purchasing pork and coffee in the second store may be determined to 15000 won on the basis of the store information stored in the storage. Thereafter, the controller 100 may determine the second store in which the total price is minimum.

In addition, when the items included in the input list of item includes a predetermined item, the controller 100 may determine a store located the closest to the input destination among stores that sell the predetermined item. In this case, the predetermined item may be stored in the storage 120, and may include an item of which freshness is important, such as pork, milk, and the like.

For example, when pork is input from the user and both the first store and the second store sell pork, the controller 100 may determine the first store located closer to the destination.

Figure 3:
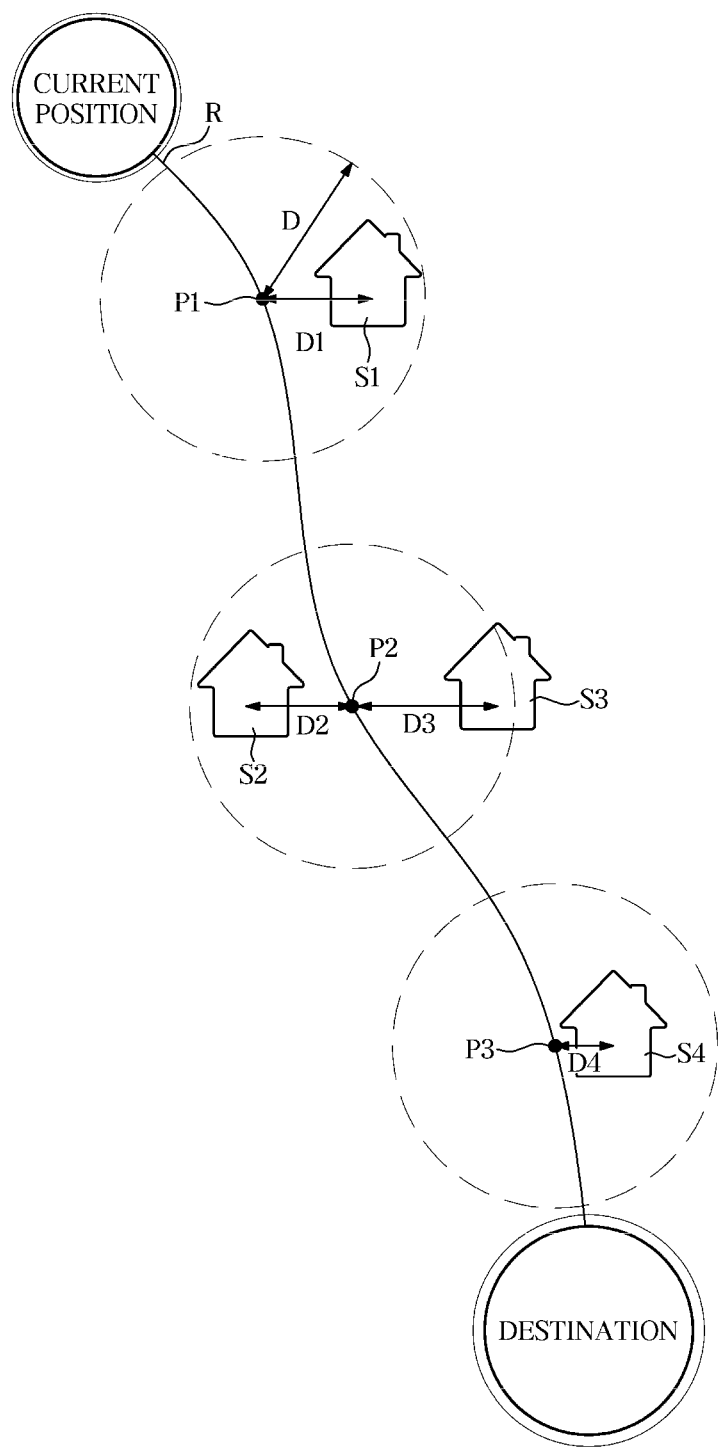
FIG. 3 is a diagram illustrating stores determined in one form of the present disclosure.

Hereinafter, a process of determining a store by the controller 100 will be described in detail with reference to FIG. 3. FIG. 3 is a diagram illustrating stores determined in some forms of the present disclosure.

Referring to FIG. 3, the inputter 110 receives a destination from a user, and the controller 100 may generate a travelling route R of the vehicle on the basis of the received destination. Thereafter, when the inputter 110 receives a list of items from the user, the controller 100 may determine at least one store that is located within a predetermined distance D with respect to the generated travelling route R and sell at least one item included in the input list of items.

In this case, the predetermined distance D may be determined as a value set by a setting of the user or a value stored in the storage 120.

In detail, the controller 100 may determine at least one store S1, S2, and S3 located within a predetermined distance D with respect to points P2, P2, and P3 on the travelling route and selling at least one items included in the input list of items.

For the sake of convenience in description, the following description is made under the assumption that the user inputs a list of items including bottled water, pork, charcoal, cookies, and beer. The controller 100 may determine the first store S1 located at a distance D1 with respect to the point P1 on the generated travelling route R shorter than the predetermined distance D and available for purchasing all the items included in the item list. In addition, the controller 100 may determine the second store S2 located at a distance D2 with respect to the point P2 on the generated travelling route R shorter than the predetermined distance D and available for purchasing only pork among the items included in the item list, and the third store S3 located at a distance D3 with respect to the point P2 on the generated travelling route R shorter than the predetermined distance D and available for purchasing all the items included in the item list except for pork. In addition, the controller 100 may determine the fourth store S4 located at a distance D4 with respect to the point P3 on the generated travelling route R shorter than the predetermined distance D and available for purchasing all the items included in the item list except for cookies and beer.

Thereafter, the controller 100 may modify the travelling route such that the vehicle passes through the determined at least one store, on the basis of the locations of the determined at least one store. The modifying of the travelling route for the vehicle to pass through the at least one store may include modifying the travelling route for the vehicle to pass through all of the determined at least one store S1, S2, S3, and S4 and modifying the travelling route for the vehicle to pass through some store S1 of the determined at least one store S1, S2, S3, and S4.

Hereinafter, a process of displaying the at least one store determined by the controller 100 on the display 130 will be described in detail with reference to FIGS. 4 to 5.

Figure 4:
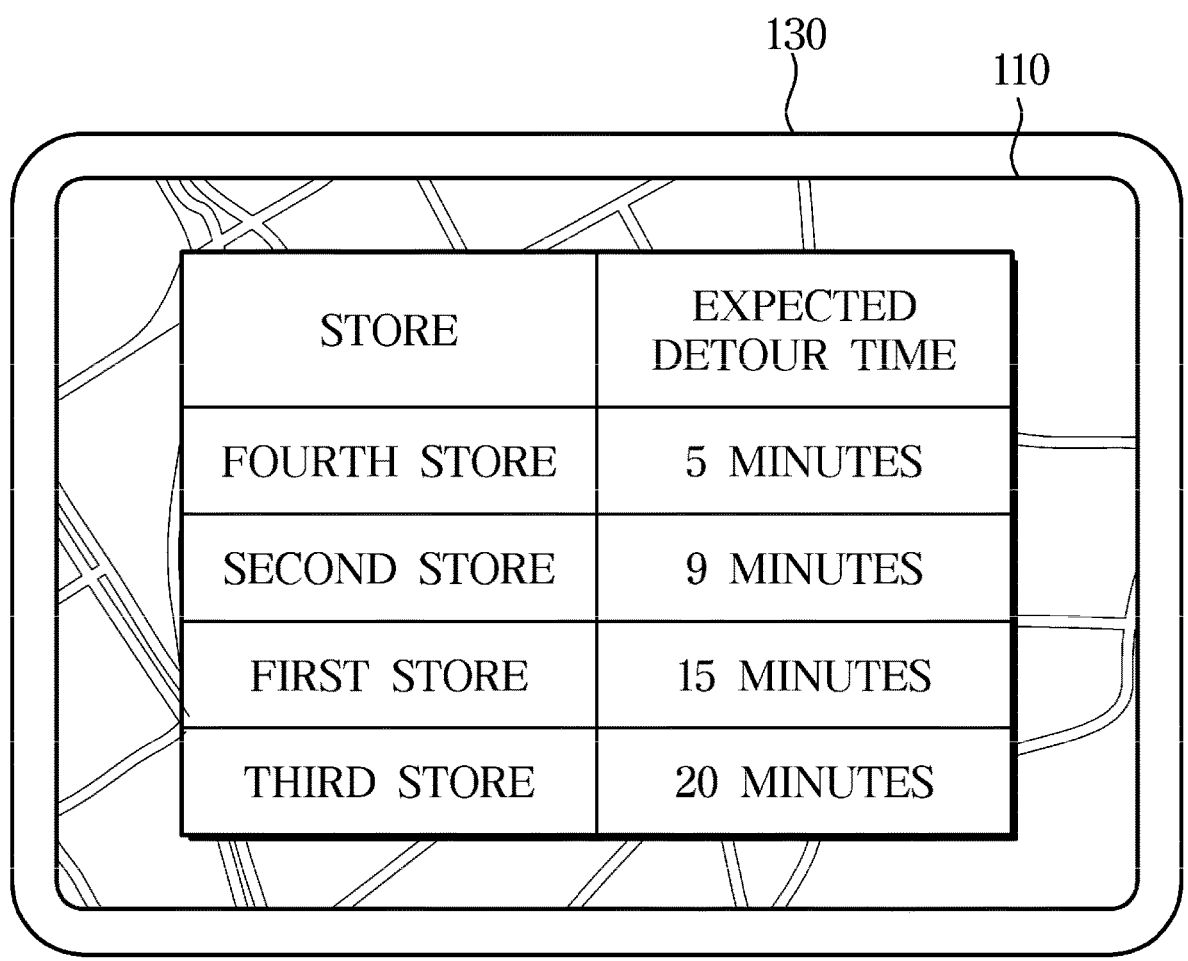
FIG. 4 is a diagram illustrating stores displayed in order of priorities of expected detour times.
Figure 5:
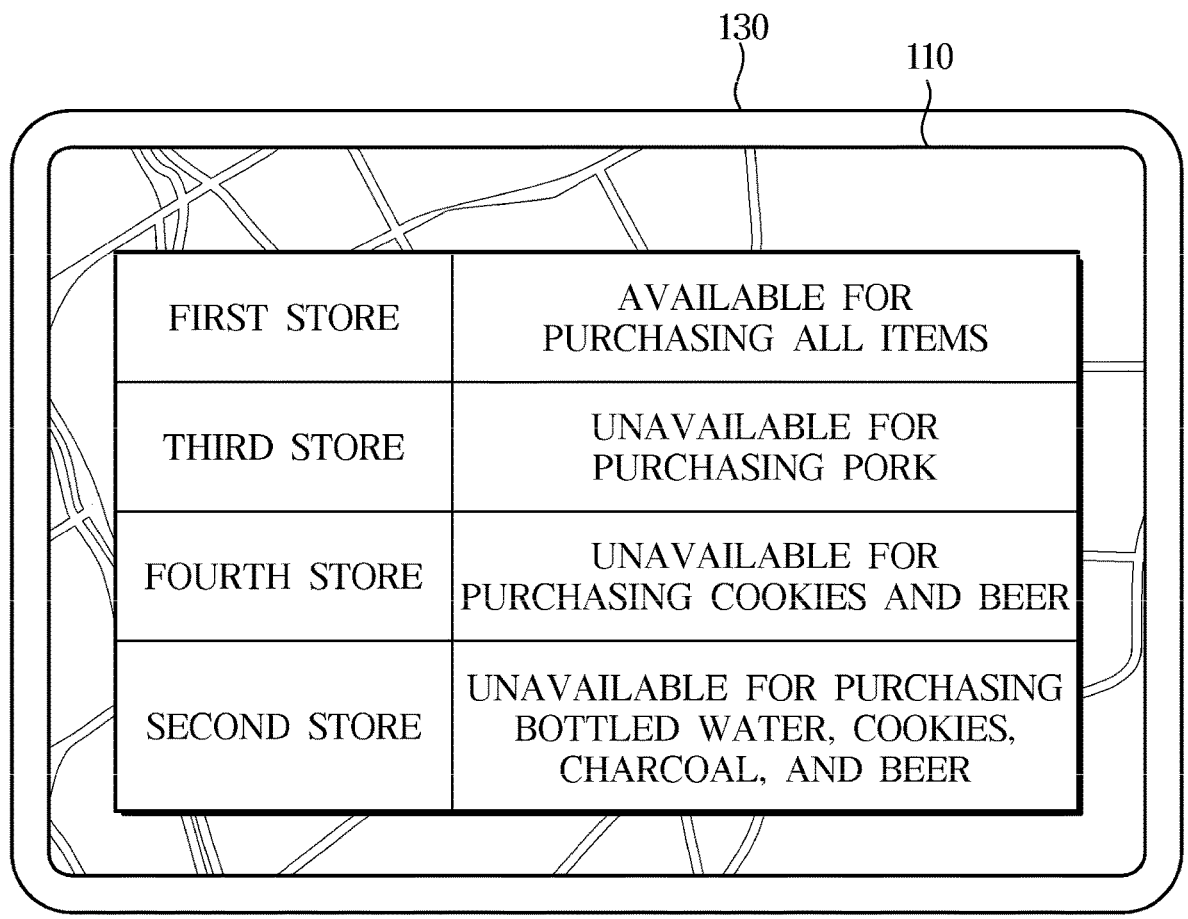
FIG. 5 is a diagram illustrating stores displayed in order of priorities of types of item on sale.

FIG. 4 is a diagram illustrating stores displayed in order of priorities of expected detour times, and FIG. 5 is a diagram illustrating stores displayed in order of priorities of types of items on sale.

Referring to 4 to 5, the controller 100 may control the display 130 to display information about the determined at least one store. Under the operation of the controller 100, the display 130 may display information about the determined at least one store.

In this case, the at least one store may include the first store S1, the second store S2, the third store S3, and the fourth store S4 as described above with reference to FIG. 3.

Referring to FIG. 4, the information about the at least one store may be displayed in order of shortest expected detour time under the operation of the controller 100.

In detail, the controller 100 may determine an expected arrival time required for the vehicle to arrive at the destination by travelling on the travelling route R generated on the basis of the destination without passing through the at least one store S1, S2, S3, and S4. For example, the controller 100 may determine the expected arrival time required for the vehicle to arrive at the destination without passing through the at least one store S1, S2, S3, and S4 to be 1 hour.

Thereafter, the controller 100 may determine an expected arrival time required for the vehicle to arrive at the destination by passing through the at least one store S1, S2, S3, and S4. For example, the controller 100 may determine a first expected arrival time required for the vehicle to arrive at the destination by passing through the first store S1 to be 1 hour 15 minutes, determine a second expected arrival time required for the vehicle to arrive at the destination by passing through the second store S2 to be 1 hour 9 minutes, determine a third expected arrival time required for the vehicle to arrive at the destination by passing through the third store S3 to be 1 hour 20 minutes, and determine a fourth expected arrival time required for the vehicle to arrive at the destination by passing through the fourth store S4 to be 1 hour 5 minutes.

The controller 100 may determine the expected arrival time required to arrive at the destination on the basis of various factors, such as map information stored in the storage 120, traffic information received from the communicator 140, and the like.

The controller 100 may determine an expected detour time required to pass through the at least one store S1, S2, S3, and S4 on the basis of the difference between the expected arrival time required to arrive at the destination without passing through the at least one store S1, S2, S3, and S4 and the expected arrival time required to arrive at the destination by passing through the at least one store S1, S2, S3, and S4.

For example, the controller 100 may determine a first expected detour time required to pass through the first store S1 to be 15 minutes, determine a second expected detour time required to pass through the second store S2 to be 9 minutes, determine a third expected detour time required to pass through the third store S3 to be 20 minutes, and determine a fourth expected detour time required to pass through the fourth store S4 to be 5 minutes.

The controller 100 may control the display 130 to display information about the first store S1 first when the first expected arrival time required to arrive at the destination by passing through the first store S1 is shorter than the second expected arrival time required to arrive at the destination by passing the second store S2.

Referring to FIG. 4, it can be seen that the first expected arrival time is longer than the second expected arrival time. Accordingly, the controller 100 may control the display 130 to display information about the second store S2 first prior to information about the first store S1. Displaying information about a store first may refer to displaying the information about the store on the top, or may refer to primarily displaying the information when a space to display information about a store is insufficient due to spatial limitation.

Referring again to FIG. 4, the controller 100 displays information about the at least one store S1, S2, S3, and S4 in order of shortest expected arrival time required to arrive at the destination by passing through the at least one store S1, S2, S3, and S4. That is, it can be seen that the fourth store S4, the second store S2, the first store S1, and the third store S3 are consecutively displayed.

Although not shown in the drawing, even when the controller 100 determines a fifth store located within a predetermined distance D with respect to the generated travelling route R and selling at least one item included in the input item list, when the fifth store has a fifth expected arrival time longer than the third expected arrival time, information about the fifth store may not be displayed on the display 130 due to spatial limitation.

Hereinafter, referring to FIG. 5, when the first store S1 sells a larger number of types of items than with the second store S2 on the basis of the types of items included in the input item list, the controller 100 may control the display 130 to display the first store S1 first.

The controller 100 may compare the types of items sold by at least one store with the types of items included in the input item list on the basis of the store information stored in the storage 120.

For example, when a user inputs a list of items including bottled water, pork, charcoal, cookies, and beer, the input list of items may be compared with a list of items sold by the first store S1. When a list of items sold by the first store S1 includes all of the bottled water, pork, charcoal, cookies, and beer, and a list of items sold by the second store S2 includes only pork, the controller 100 may determine that the first store S1 sells a larger number of types of items than with the second store S2, and control the display 130 to display the first store S1 first.

Referring again to FIG. 5, the controller 100 may determine that the first store S1 sells all of the bottled water, pork, charcoal, cookies, and beer, the second store S2 sells only pork, the third store S3 sells bottled water, charcoal, cookies, and beer, and the fourth store S4 sells bottled water, pork and charcoal on the basis of the store information stored in the storage 120.

Thereafter, the controller 100 may control the display 130 to display the at least one store in the order of the first store S1, the third store S3, the fourth store S4, and the second store S2.

As described above with reference to FIGS. 4 and 5, the controller 100 may control the display 130 to display the determined at least one store on the basis of the priority. In this case, the priority may be determined on the basis of the expected detour time, the number of types of items on sales corresponding to the types of items included in the input item list, and the like. In addition, the priority may be determined on the basis of a criterion set by the user.

In addition, the user may input a selection of one or more stores on the basis of the information about the at least one store shown in FIGS. 4 and 5. Hereinafter, referring to FIG. 6, a case in which the inputter 110 receives a selection of one or more stores S1 among the four stores S1, S2, S3, and S4 determined by the user is described.

Figure 6:
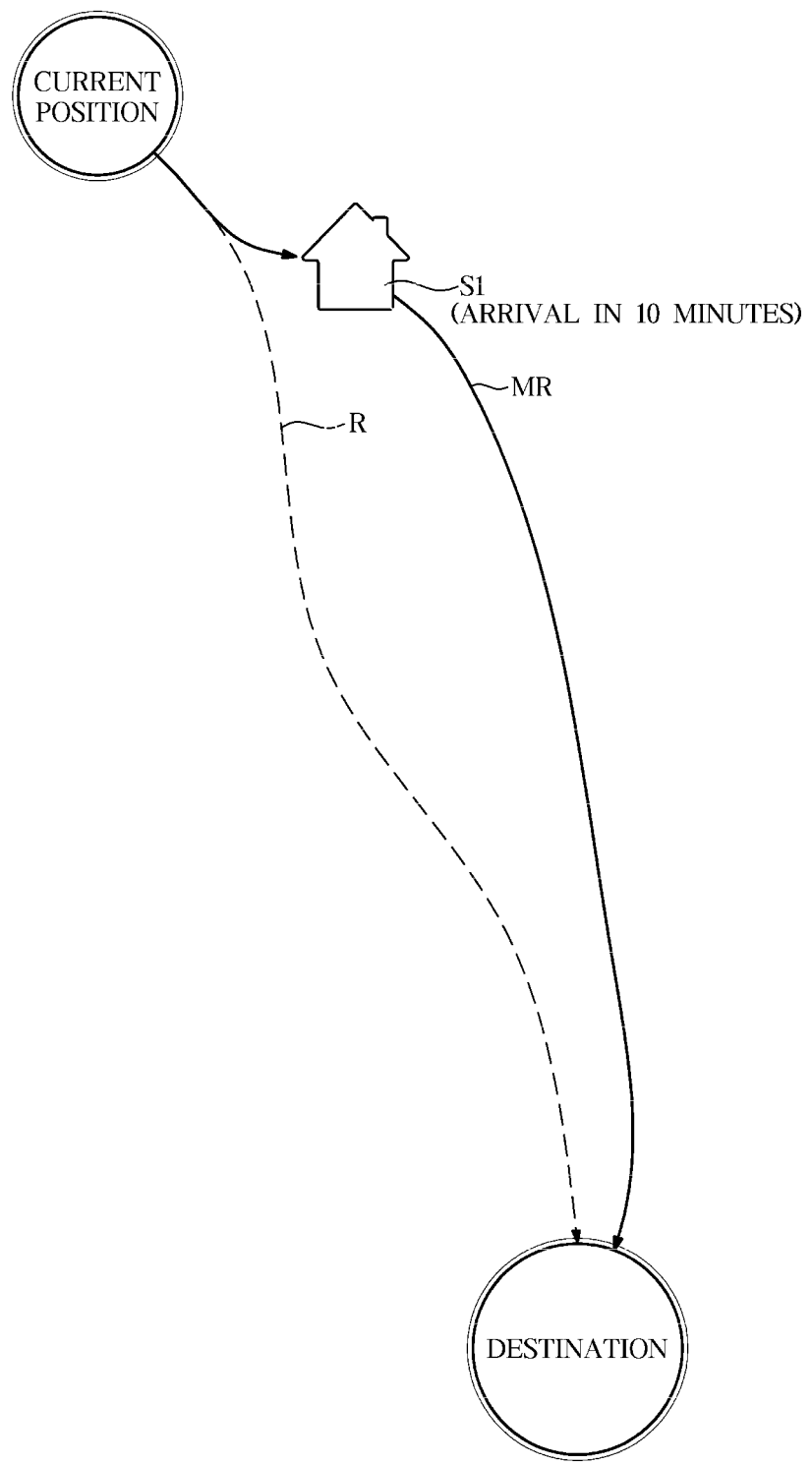
FIG. 6 is a diagram illustrating a travelling route modified to pass through a selected store in one form of the present disclosure.

FIG. 6 is a diagram illustrating a travelling route modified to pass through a selected store in some forms of the present disclosure. Referring to FIG. 6, the inputter 110 receives an input of one or more stores among the at least one store from the user, and the controller 100 may modify the generated travelling route for the vehicle to pass through the selected one or more stores on the basis of the locations of the selected one or more stores.

For example, the inputter 110 may receive a selection of the first store S1 among the determined four stores S1, S2, S3, and S4. The controller 100 may generate a new travelling route MR by modifying the generated travelling route such that the vehicle passes through the first store S1, on the basis of the location of the selected first store S1.

In addition, the controller 100 may determine an expected arrival time required for the vehicle to arrive at the selected one or more stores on the basis of the modified travelling route. That is, the controller 100 may determine an expected arrival time required for the vehicle to arrive at the first store S1 to be 10 minutes on the basis of the modified travelling route MR. In this case, the communicator 140 may transmit the determined expected arrival time to the server according to determination of the controller 100.

Figure 10:
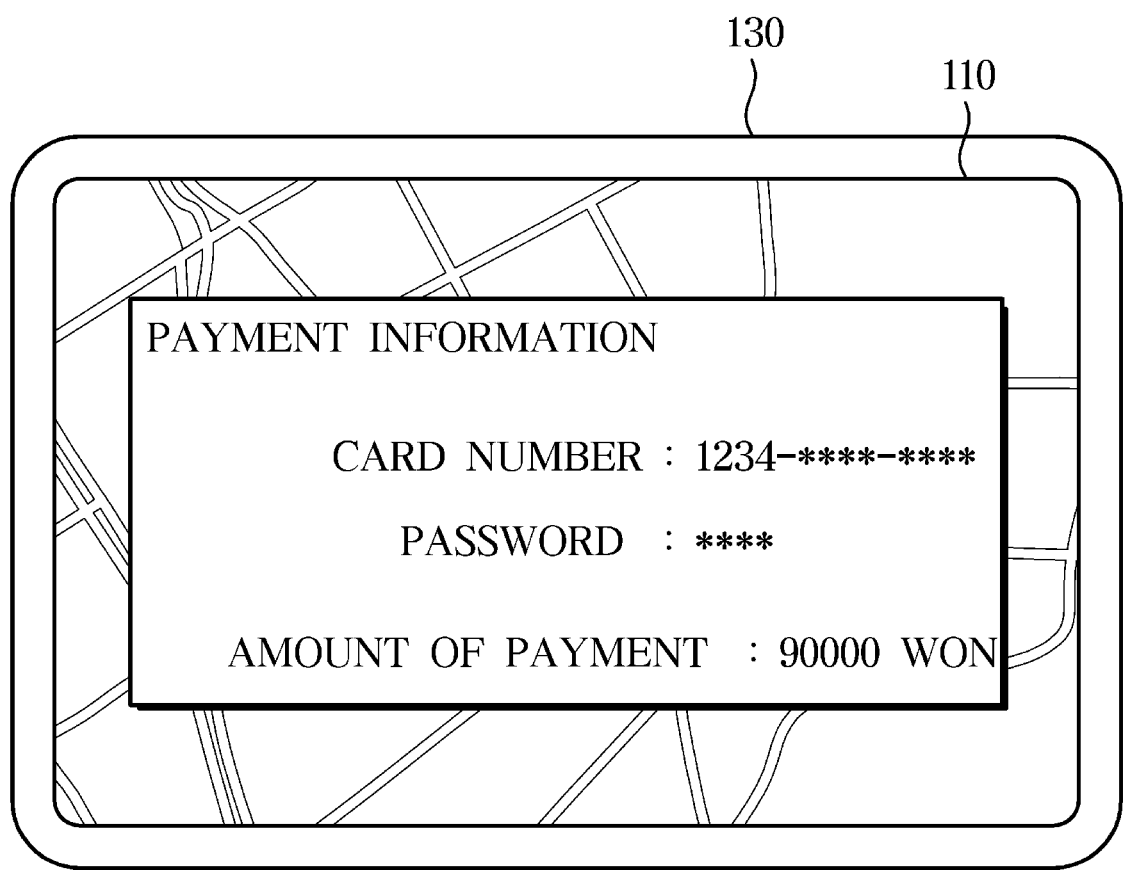
FIG. 10 is a diagram illustrating input payment information in one form of the present disclosure.

The reason why the communicator 140 transmits the determined expected arrival time to the server will be described with reference to FIGS. 9 and 10 in detail.

Hereinafter, a list of recommended items for user convenience will be described with reference to FIGS. 7 and 8. FIG. 7 is a diagram for describing a list of recommended items according to a destination, and FIG. 8 is a diagram for describing a list of recommended items according to a purchase history.

Referring to FIG. 7, the storage 120 may store a list of recommended items according to a destination. For example, when the type of the destination is classified as a camping ground, the storage 120 may store a list of items including bottled water, pork, charcoal, cookies, beer, and other items desired when visiting the camping ground. In addition, when the type of the destination is classified as one's husband's parents' home or one's wife's parents' home, the storage 120 may store a list of items including fruits, cakes, and other items desired when visiting one's husband's parents' home or one's wife's parents' home, and when the type of the destination is classified as an office, the storage 120 may store a list of items including coffee and the like.

The controller 100 may control the display 130 to display the stored list of recommended items on the basis of the destination input by the user. In detail, when the user inputs an XX camping ground as the destination by selecting a first icon, and selects a second icon to input a list of items, the controller 100 may control the display 130 to display the list of recommended items corresponding to the camping ground.

Accordingly, the user may simply select items to be purchased from the displayed list of recommended items without needing to directly input a list of items.

Referring to FIG. 8, the storage 120 may store a list of recommended items according to an item purchase history of a user. In this case, the item purchase history may include the date and destination information at the time of purchasing the item.

The controller 100 may control the display 130 to display the stored list of recommended items according to the item purchase history. In detail, when the user inputs a destination by selecting a first icon, and selects a second icon to input a list of items, the controller 100 may control the display 130 to display a list of recommended items according to a purchase history.

Accordingly, the user may simply select items to be purchased from the displayed list of recommended items without needing to directly input a list of items. In this case, for the convenience of the user, a list of items frequently used by the user may be stored and displayed first.

Hereinafter, a process of paying for an item by a user in a vehicle will be described with reference to FIGS. 9 and 10. FIG. 9 is a diagram illustrating a payment window for paying for an item in a vehicle in some forms of the present disclosure, and FIG. 10 is a diagram illustrating input payment information in some forms of the present disclosure.

Referring to FIG. 9, when the inputter 110 receives a selection of one or more stores among at least one store, the controller 100 may control the display 130 to display information about the selected one or more stores. In this case, the information about the store may information about a list of items sold by the store corresponding to an input list of items. The information about the list of items sold by the store may include information about the name and price of the items.

For example, when the inputter 110 receives a selection of a first store and a second store, the controller 100 may control the display 130 to display lists of items sold by the first store and the second store and prices corresponding to the items.

The user may input the purchase quantity on the basis of the displayed list of items and prices, and the controller 100 determine a total purchase price according to the purchase quantity input by the user, and controls the display 130 to display the total purchase price.

The user may select a payment button when the input of the purchase quantity is completed, and the controller 100, upon receiving the selection of the payment button, may control the display 130 to display a payment window for receiving an input of payment information.

Thereafter, the inputter 110 may receive payment information for purchasing at least one item included in the item list in the selected one or more stores.

The controller 100 may control the communicator 140 to transmit the input payment information to the server, and the communicator 140 may transmit the input payment information to the server.

As described above with reference to FIG. 6 or 10, the server may receive payment information for purchasing items in one or more stores and expected arrival time required to arrive at one or more stores.

The server may transmit the received information to the one or more stores, and the one or more stores may make a payment on the basis of the payment information and may prepackage the items purchased by the user on the basis of the expected arrival time.

That is, the user may make a payment in advance in the vehicle and upon arriving at the store at the expected arrival time, may receive the packaged items, so that the time required for purchasing the items is reduced.

Figure 11:
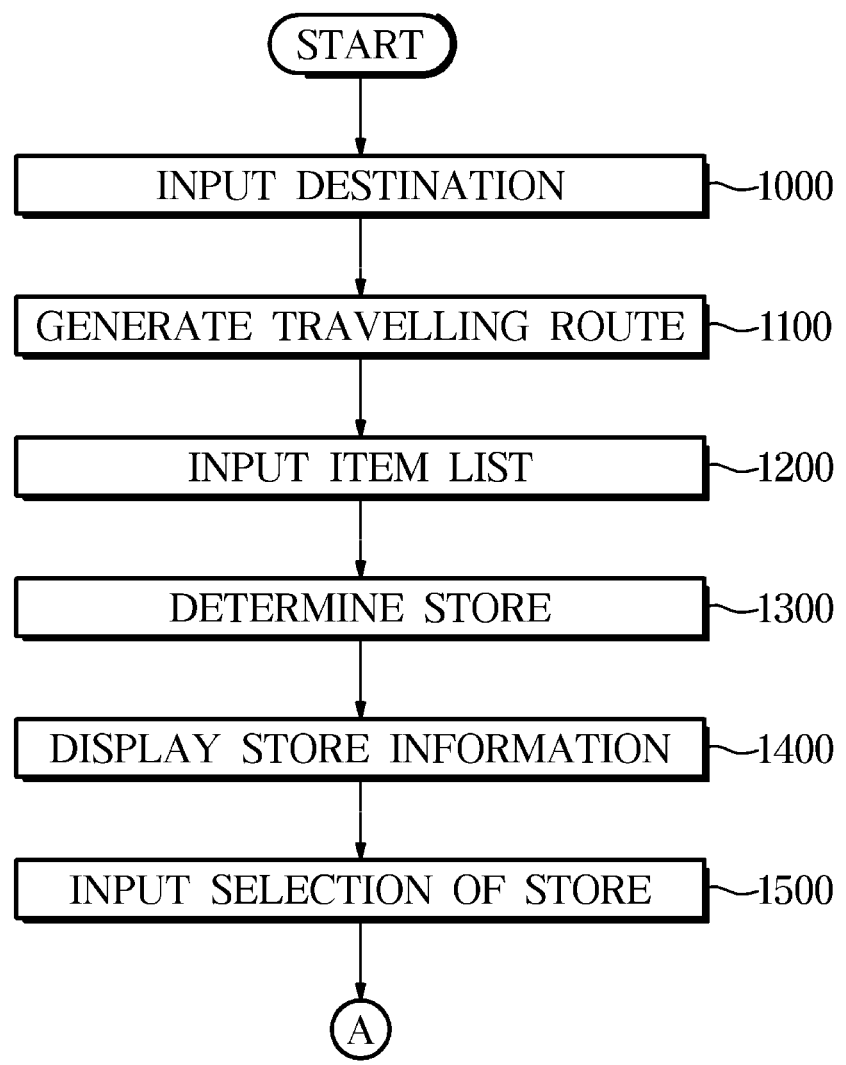
FIGS. 11 and 12 are flow charts showing a method of controlling a vehicle in one form of the present disclosure.
Figure 12:
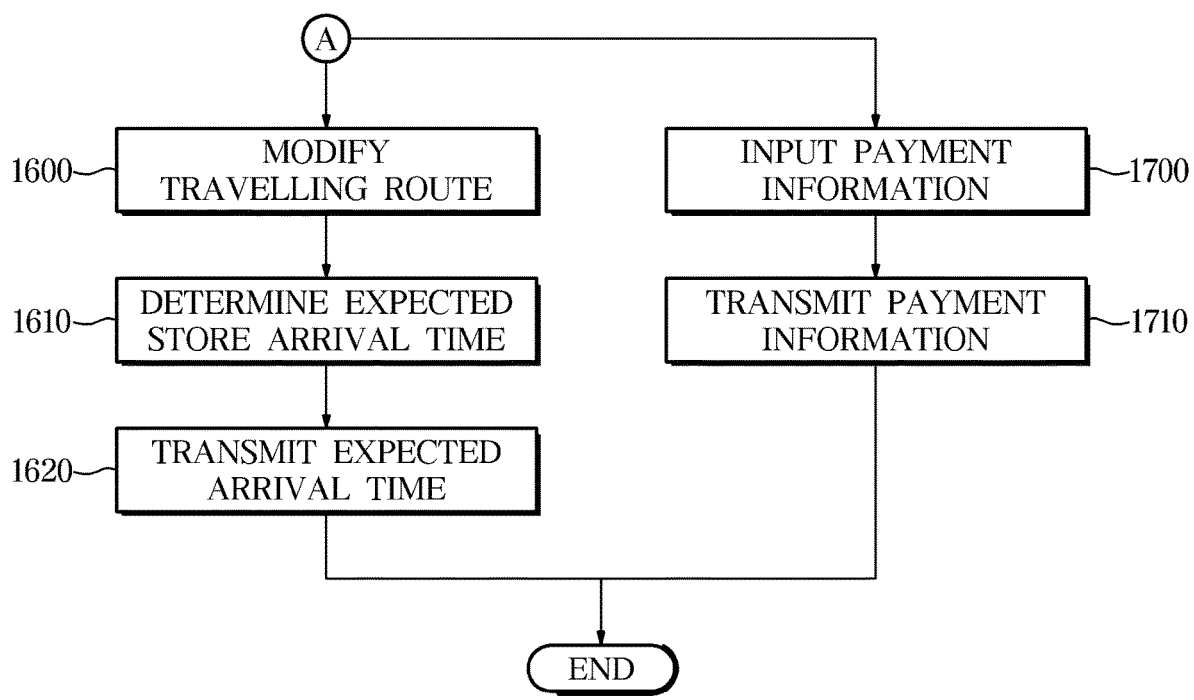

Hereinafter, a method of controlling a vehicle in some forms of the present disclosure will be described with reference to FIGS. 11 and 12. FIGS. 11 and 12 are flow charts showing a method of controlling a vehicle in some forms of the present disclosure.

Referring to FIGS. 11 to 12, the inputter 110 of the vehicle may receive a destination from a user (1000). The controller 100 may generate a travelling route of the vehicle on the basis of the input destination (1100). The inputter 110 may receive a list of items from the user (1200), and the controller 100 may determine at least one store located within a predetermined distance with respect to the generated travelling route and selling at least one item included in the input item list (1300). In this case, the controller 100 may modify the travelling route for the vehicle to pass through the determined at least one store on the basis of the location of the at least one store.

The determining of the at least one store by the controller 100 may include determining at least one store each selling all the items included in the input item list, determining a total price of all the items sold by each of the determined at least one store, and determining a store in which the total price of all the items is minimum.

In addition, the determining of the at least one store by the controller 100 may include, when items included in the input item list include a predetermined item, determining a store located the closest to the input destination among stores selling the predetermined item.

Thereafter, the controller 100 may control the display 130 to display information about the determined at least one store (1400). When the information about the at least one store is displayed on the display 130, the inputter 110 may receive a selection of one or more stores among the displayed at least one store from the user (1500).

Thereafter, the controller 100 may modify the travelling route of the vehicle on the basis of the selected one or more stores (1600). In addition, the controller 100 may control the display 130 to display a list of items sold by the selected one or more stores and a price corresponding to each item, and the inputter 110 may receive payment information for paying for at least one item included in the item list from the user (1700).

Meanwhile, the controller 100 may determine an expected arrival time required to arrive at the selected one or more stores on the basis of the modified travelling route (1610), and the communicator 140 may transmit the expected arrival time to the server (1620). In addition, the communicator 140 may transmit the payment information input into the inputter 110 to the server (1710).

Although not shown in the drawings, the server may transmit the received information to the one or more stores, and the one or more stores may make a payment on the basis of the payment information and may prepackage the items purchased by the user on the basis of the expected arrival time.

That is, the user may make a payment in advance in the vehicle, and upon arriving at the store at the expected arrival time, may receive the packaged items, so that the time required for purchasing the items is reduced.

Although the vehicle and the method of controlling the vehicle in some forms of the present disclosure have been described in relation that all the processes are performed by the vehicle, it should be understood by a person skilled in the art that all the processes can be implemented in one system.

That is, a system for ordering an item in association with a destination may include: a vehicle configured to generate a travelling route on the basis of position information of the vehicle and destination information received from a user, transmit the generated travelling route and a list of items received from the user to a server, and receive information about at least one store from the server; and the server configured to determine at least one store on the basis of the travelling route and the list of items received from the vehicle and transmit information about the determined at least one store to the vehicle.

In this case, the vehicle may modify the generated travelling route on the basis of the information about the at least one store transmitted from the server, or the server may generate a travelling route for the vehicle to pass through the at least one store and transmit the generated travelling route to the vehicle.

In addition, the vehicle may receive payment information for purchasing at least one item included in the item list in the at least one store, and may transmit the input payment information to the server, and the server may transmit the payment information transmitted from the vehicle to the at least one store.

As is apparent from the above, an optimum travelling route is generated only by an input of a destination and a list of items, so that the user can save time. In addition, payment for purchasing items is performed in the vehicle without needing to spare a time for the purchase, so that user convenience can be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
a storage configured to store map information and store information;
an inputter configured to receive an input of a destination and an item list from a user;
a display; and
a controller configured to:
generate a traveling route of the vehicle based on the stored map information and a received destination;
determine at least one target store among a plurality of stores that is located within a predetermined distance with respect to the generated travelling route and that sells at least one item included in a received item list;
modify the generated travelling route such that the vehicle passes through the at least one target store based on a location of the at least one target store;
control the display to display information regarding the at least one target store and the modified travelling route,
wherein the at least one target store among the plurality of stores is determined by:
determining at least one first store that sells all of the items included in the received item list among the plurality of stores,
determining a total price of all the items sold by the at least one first store;
among the at least one first store, determining a first store in which the total price of all the items is cheapest as one of the at least one target store;
when the items included in the received item list includes a predetermined item which is pre-stored in the storage as an item of which freshness is important, determining at least one second store that sells the predetermined item among the plurality of stores; and among the at least one second store, determining a second store that is located closest to the received destination as another one of the at least one target store.

2. The vehicle of claim 1, wherein the controller is configured to:
determine an expected arrival time at the destination by passing through the at least one target store; and
control the display to display information about a first target store of the at least one target store first when a first expected arrival time at the destination by passing through the first target store is less than a second expected arrival time at the destination by passing through a second target store of the at least one target store.

3. The vehicle of claim 1, wherein the controller is configured to control the display to display information about a first target store of the at least one target store first when the first target store sells a larger number of types of items than a second target store of the at least one target store with respect to the items included in the received item list.

4. The vehicle of claim 1,
wherein the storage is configured to store a list of recommended items corresponding to the destination, and
wherein the controller is configured to control the display to display the stored list of recommended items based on the received destination.

5. The vehicle of claim 1,
wherein the storage is configured to store a list of recommended items based on an item purchase history of the user, and
wherein the controller is configured to control the display to display the stored list of recommended items.

6. The vehicle of claim 1,
wherein the at least one target store includes a plurality of target stores,
wherein the inputter is configured to receive a selection of at least one target store among the plurality of target stores from the user, and
wherein the controller is configured to modify the generated travelling route such that the vehicle passes through the selected at least one target store.

7. The vehicle of claim 1, wherein the inputter is configured to receive payment information to pay for at least one item included in the item list in the at least one target store.

8. A method of controlling a vehicle, the method comprising:
receiving, by an inputter, an input of a destination from a user;
generating, by a controller, a traveling route of the vehicle based on a received destination;
receiving, by an inputter, an item list from the user;
determining, by the controller, at least one target store among a plurality of stores that is located within a predetermined distance with respect to the generated travelling route and that sells at least one item included in the received item list;

modifying, by the controller, the generated travelling route such that the vehicle passes through the at least one target store based on a location of the at least one target store; and
displaying, on a display, information regarding the at least one target store and the modified travelling route,
wherein determining, by the controller, the at least one target store comprises:
determining at least one first store that sells all of the items included in the received item list among the plurality of stores,
determining a total price of all the items sold by the at least one first store,
among the at least one first store, determining a first store in which the total price of all the items is cheapest as one of the at least one target store,
when the items included in the received item list includes a predetermined item which is pre-stored in a storage as an item of which freshness is important, determining at least one second store that sells the predetermined item among the plurality of stores, and
among the at least one second store, determining a second store that is located closest to the received destination as another one the at least one target store.

9. The method of claim 8, further comprising:
determining, by the controller, an expected arrival time at the destination by passing through the at least one target store; and
displaying, on the display, information about a first target store of the at least one target store first when a first expected arrival time at the destination by passing through the first store is less than a second expected arrival time at the destination by passing through a second target store of the at least one target store.

10. The method of claim 8, wherein displaying, on the display, the information of the at least one target store comprises displaying, on the display, information about a first target store of the at least one target store first when the first store sells a larger number of types of items than a second target store of the at least one target store with respect to the items included in the received item list.

11. The method of claim 8, further comprising displaying, on the display, a list of recommended items corresponding to the destination.

12. The method of claim 8, further comprising displaying, on the display, a list of recommended items based on an item purchase history of the user.

13. The method of claim 8, wherein the at least one target store includes a plurality of target stores, and wherein the method further comprises:
receiving a selection of at least one target store among the plurality of target stores from the user; and
modifying the generated travelling route such that the vehicle passes through the selected at least one target store.

14. The method of claim 8, further comprising receiving payment information to pay for at least one item included in the item list in the at least one target store.

* * * * *